(12) United States Patent
Lehmberg et al.

(10) Patent No.: US 6,274,187 B1
(45) Date of Patent: *Aug. 14, 2001

(54) AQUEOUS TEA EXTRACT CONCENTRATE STABLE AT AMBIENT TEMPERATURE

(75) Inventors: Gregg Lance Lehmberg, Somerset, NJ (US); Sheng Xue Ma, Altamonte Springs, FL (US)

(73) Assignee: Thomas J. Lipton Co., division of Conopco, Inc., Englewood Cliffs, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/763,592

(22) Filed: Feb. 28, 1997

Related U.S. Application Data

(60) Provisional application No. 60/020,304, filed on Jun. 19, 1996, and provisional application No. 60/019,986, filed on Jun. 19, 1996.

(51) Int. Cl.$^7$ .................................. A23F 3/34; A23F 3/00
(52) U.S. Cl. ........................................... 426/435; 426/597
(58) Field of Search ..................................... 426/435, 597

(56) References Cited

U.S. PATENT DOCUMENTS

| | | | |
|---|---|---|---|
| 4,048,344 | * 9/1977 | Gasser et al. | 426/387 |
| 4,472,441 | * 9/1984 | Clark et al. | 426/435 |
| 4,748,033 | * 5/1988 | Syfert et al. | 426/597 |
| 5,427,806 | * 6/1995 | Ekanayake et al. | 426/330.3 |

* cited by examiner

Primary Examiner—Anthony J. Weier
(74) Attorney, Agent, or Firm—James J. Farrell

(57) ABSTRACT

A stable tea concentrate of about 50% to about 70% tea solids is prepared by aqueous extraction.

4 Claims, 1 Drawing Sheet

AQUEOUS TEA EXTRACT CONCENTRATE STABLE AT AMBIENT TEMPERATURE

CROSS-REFERENCE TO RELATED APPLICATION

This application claims the benefit of U.S. Provisional Application Nos. 60/020,304 filed Jun. 19, 1996 and 60/019,986, filed Jun. 19, 1996.

FIELD OF THE INVENTION

This invention generally relates to tea concentrates having about 50 to about 70% or even higher tea solids.

BACKGROUND OF THE INVENTION

Shelf stable tea concentrates are highly desirable and have several applications. These include: the ability to supply a natural tea concentrate for use in Ready-to-Drink tea and Fountain tea products; as a tea concentrate product for retail sale; and as a preferred method of transporting tea solids. The advantages of a tea concentrate over a powder or a dilute tea extract are that better tea character is obtained. In addition, less energy is employed than for a powder and less weight and volume are needed for shipping a concentrate than for a dilute extract.

In the prior art, tea concentrates were considered to be physically unstable, which prevented their use in many tea products. However, it is believed that under certain conditions tea products made from tea concentrates have better quality (e.g., flavor, freshness, etc.) than powders and are more economical than tea powder or dilute tea extract. Therefore, it is highly desirable to have a shelf stable tea concentrate.

The addition of a selected level of high methoxy citrus pectin stabilizes tea products having about 0.1% tea solids and prevents haze and precipitation. This is disclosed in U.S. Pat. No. 5,529,796. However, the same approach to stabilize tea concentrates up to about 40% solids was not successful.

U.S. Pat. No. 4,748,033 disclosed the use of edible gums (xanthan gum, cellulose gums, locust bean gum, sugar gum and mixtures) to prevent flake formation during cyclic freezing and thawing, and to enhance cold water solubility. The solids level for the tea concentrate specified in the patent was 0.4% to 8% (w/w) and the use level of xanthan gum was 5–12% weight of gum to weight of tea solids.

U.S. Pat. No. 4,051,267 to Jongeling disclosed the use of carrageenans for suspending and stabilizing tannins in a tea extract which is transported in a frozen or chilled condition for use in vending machines. However, Jongeling found that the viscosity of the tea extract using xantham gum was so high that the accuracy of dosing in the dispensing machine was impaired.

The use of individual gums or mixtures of gum with selected tea extracts has been disclosed. However, the current invention is very different from the teachings of the prior art. The prior art dealt with much lower levels of tea solids, i.e. 0.4–8%. Further, the prior art did not stabilize tea concentrates containing 50–70% solids. Additionally, the prior art required low temperatures (refrigerated or frozen) to maintain the flavor, clarity, stability and shelf life of the products. Tea concentrates prepared by the current invention in contrast to the art are stable at ambient temperatures.

Accordingly an object of the invention is to prepare extracted tea concentrates at high concentrations which may be stored at ambient temperature for at least three months with good quality. It is believed that this is the first time that tea solids at such high concentrations have been stabilized for extended periods at ambient temperatures.

SUMMARY OF THE INVENTION

In order to achieve the goal of shelf stable tea concentrates, tea extracts from continuous or batch extraction using tea leaves (i.e., green, black, and oolong tea) were centrifuged and concentrated. The concentrate was pasteurized, aseptically packed, and stored at ambient temperature. The products made from the concentrate have a fresh brewed tea flavor and good clarity.

Ready-to-Drink (RTD) products prepared from three month old tea concentrates are expected to deliver clear tea beverages with good organoleptic properties and acceptability. No off-flavor or precipitation was detected in the concentrate.

DETAILED DESCRIPTION OF THE INVENTION

Figure 1:
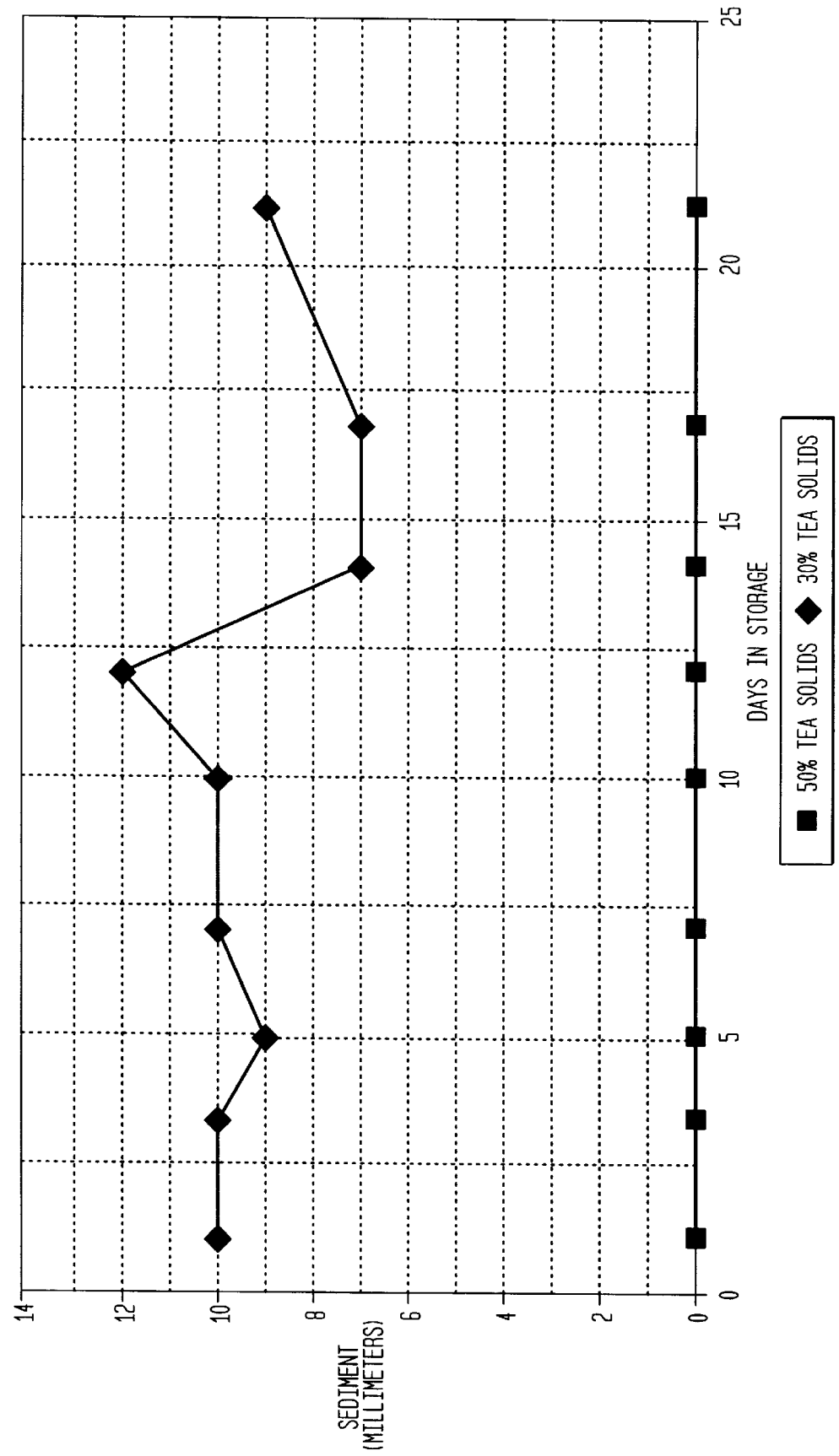
FIG. 1 represents a graph of the values reported in Example 1 (30 and 50%).

Black teas, particularly those selected to have a low cream index and which produce highly colored infusions are essentially preferred for the process but, of course, Green and Oolong teas may also be employed if appropriate care is taken.

Preferably, black tea with the above characteristics is extracted for from about five minutes up to several hours or more with water at a temperature of about 70° F. to 210° F. at water to leaf ratios of from about 5:1 to 30:1. Higher or lower water to leaf ratios could be employed but are impractical. It is preferred to extract the tea at about 100° F. to about 190° F. at a water to leaf ratio of about 10:1. The tea leaf is separated from the tea extract. The separated or decanted tea extract may then be stripped if desired, to collect additional aroma.

The optionally, stripped extract is then cooled and polished by centrifugation or other clarification methods such as filtration and the like. After polishing the extract is then concentrated preferably by vacuum. The extract is then concentrated to about 50% to 70% tea solids preferably about 50% to 60% tea solids.

Polisher Operation

The extract temperature should be about 140° F. or less, preferably about 55° F. to 90° F. The extract is fed to a centrifuge where it is spun for nominally 2 minutes at approximately 8,000 times gravity. The sludge is disposed of and the polished extract retained for concentration. The extract is polished at 4% to about 10% tea solids.

Concentration

Once the polished tea extract has been prepared it is then concentrated by means well known in the art. Preferably the concentrates are prepared by evaporation under vacuum. The preferred conditions if evaporation is used are a temperature of about 115° F. to 195° F. and an absolute pressure of about 1.5 psia to about 10 psia. In this way the extract can be concentrated without having a negative impact on the organoleptic properties of the tea. A commercial rising or falling film evaporator is usually employed. Once the tea is concentrated to a level of about 50% to about 70% tea solids it is found to be stable.

The tea extract can be concentrated to any level above about 50% which is still fluid enough to be workable. Levels of about 50% to about 70% and preferably about 50% to about 60% are preferred for ease of handling.

As used herein, the term "tea concentrate" refers to a product derived from concentrated tea extract which is diluted with water to form a drinkable tea beverage. Tea concentrates of the present invention comprise from about 50% to about 70% tea solids. Preferred tea concentrates of the present invention comprise from abut 50 to about 60% by weight tea solids. The tea concentrates of the present invention are in liquid product form.

As used herein, the term "tea beverage" refers to a drinkable beverage prepared from the tea concentrates of the present invention by dilution with water. The tea concentrates of the present invention are generally diluted with sufficient water to provide the tea beverage. Preferred tea concentrates are typically diluted to a minimum of about 0.08% tea solids to provide the tea beverage.

As used herein, the term "tea solids" refers to those solids normally present in a tea extract. Polyphenolic compounds are normally the primary component of tea solids. However, tea solids can also include caffeine, proteins, amino acids, minerals and carbohydrates.

All parts percentages and proportions herein are by weight unless otherwise specified.

EXAMPLE 1

The solids level of the tea concentrates examined ranged from 0.72% to 50%. Lower tea solids concentrations were obtained by diluting the 55% concentrate with deionized hot water in a closed centrifuge tube by vigorous shaking. The 55% concentrate was pasteurized using microwave energy prior to dilution. The products were stored at ambient temperature.

The results indicated that tea concentrates produced from leaf extracted with water at solids concentrations about 50% or higher were stable and below 50%, the stability began to deteriorate. It is surprising and encouraging that higher solids concentrations are more stable because tea concentrates at higher solids concentration are more desirable than lower solids due to reduced volumes of handling and transportation.

The concentrates were tested in a 200 ml (nominal capacity) centrifuge tube, obtained from the Nalge® Company. The tube was 61.5 mm in diameter and 126.5 mm in length. The tube had a conical bottom holding about 50 ml. The amount of sediment in the bottom after selected periods of time can be observed visually. The physical stability of the products were scored based on the degree of precipitation at the bottom of the tube. The evaluation criteria for stable tea concentrates was that they be substantially free of precipitates at the bottom of the tube, and preferably less than 1 mm.

The numerical results of tests are reported in Table 1 below.

| % Solids | DAY # | | | | | | | | |
| --- | --- | --- | --- | --- | --- | --- | --- | --- | --- |
| | 1 | 3 | 5 | 7 | 10 | 12 | 14 | 17 | 21 |
| | SEDIMENT MILLIMETER | | | | | | | | |
| 50.00% | 0 | 0 | 0 | 0 | 0 | 0 | 0 | 0 | 0 |
| 30.00% | 10 | 10 | 9 | 10 | 10 | 12 | 7 | 7 | 9 |
| 15.00% | 8 | 7 | 13 | 9 | 10 | 9 | 8 | 8 | 9 |
| 6.00% | 6 | 7 | 9 | 6 | 6 | 5 | 15 | 16 | 16 |
| 2.10% | 3 | 4 | 4 | 4 | 6 | 7 | 7 | 7 | 8 |
| 0.72% | 3 | 4 | 3 | 3 | 4 | 4 | 3 | 3 | 4 |

Although the invention has been described in detail with respect to preferred embodiments thereof, variations and modifications will be readily apparent to those skilled in the art without departing from the spirit and scope of the invention as set forth in the claims.

What is claimed is:

1. An aqueous tea concentrate having at least about 50% tea solids being stable with less than 1 mm of precipitate for at least about three months at ambient temperature.

2. A process for physically stabilizing a tea concentrate for at least about 3 months comprising:

(i) extracting tea leaves with water (ii) polishing the extract (iii) concentrating the polished extract to a concentration of about 50% to about 70% tea solids (iv) pasteurizing the polished extract; and (v) storing said concentrate at ambient temperature for a period of 21 days to three months.

3. An aqueous tea concentrate prepared by the process of claim 2 and having a physical stability with substantially no precipitate when stored at ambient temperature for at least three months, said concentrate having about 50% to 70% of said tea solids.

4. An aqueous tea concentrate as defined in claim 3 where the amount of tea solids is from about 50% to about 60%.

* * * * *